US012463844B2

(12) United States Patent
Saitoh et al.

(10) Patent No.: US 12,463,844 B2
(45) Date of Patent: Nov. 4, 2025

(54) VEHICLE COMMUNICATION SYSTEM, VEHICLE COMMUNICATION METHOD, AND CONTROL DEVICE

(71) Applicant: HONDA MOTOR CO., LTD., Tokyo (JP)

(72) Inventors: Tatsuroh Saitoh, Tokyo (JP); Tomoya Nishino, Tokyo (JP); Hiroaki Hakukawa, Tokyo (JP); Sora Nishigaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/187,888

(22) Filed: Mar. 22, 2023

(65) Prior Publication Data

US 2023/0318873 A1    Oct. 5, 2023

(30) Foreign Application Priority Data

Mar. 31, 2022   (JP) .................. 2022-061063

(51) Int. Cl.
*H04L 12/40* (2006.01)
(52) U.S. Cl.
CPC .......... *H04L 12/40006* (2013.01); *H04L 2012/40273* (2013.01)
(58) Field of Classification Search
CPC ... H04L 12/28; H04L 12/40; H04L 12/40006; H04L 12/40013; H04L 12/403;
(Continued)

(56) References Cited

U.S. PATENT DOCUMENTS 10,678,243 B2 * 6/2020 Luo .................. G05D 1/027
10,958,576 B2 * 3/2021 Joshi ................ H04L 67/12
(Continued)

FOREIGN PATENT DOCUMENTS

JP    2004-254196 A    9/2004
JP    2007-097157 A    4/2007
(Continued)

OTHER PUBLICATIONS

Machine Translation of WIPO Publication WO 2015028342 A1, 2015. (Year: 2015).*

(Continued)

*Primary Examiner* — Steven G Snyder
(74) *Attorney, Agent, or Firm* — Rankin, Hill & Clark LLP (57) ABSTRACT

A vehicle communication system includes a plurality of ECUs connected by the communication network including a plurality of communication transmission lines. Each of the ECUs includes an identification unit that identifies a target ECU to be a communication partner, and a relay transmission line and a relay ECU through which communication with the target ECU is routed, a standby time determination unit that determines a transmission standby time based on information on the relay ECU, the transmission standby time being a time from transmission of an activation instruction to another one of the ECUs closest to the ECU along the relay transmission line to transmission of a control signal toward the target ECU, and a communication unit that transmits the control signal after an elapse of the transmission standby time after transmitting the activation instruction to the relay transmission line closest to the ECU.

5 Claims, 5 Drawing Sheets

(58) Field of Classification Search
CPC .............. H04L 67/12; H04L 69/18; H04L
2012/40215; H04L 2012/40221; H04L
2012/40228; H04L 2012/40241; H04L
2012/40273
USPC ............................................ 710/58, 59, 110
See application file for complete search history.

(56) References Cited

U.S. PATENT DOCUMENTS

| | | | |
|---|---|---|---|
| 11,694,489 B2* | 7/2023 | Shidai ................ | H04L 63/1416 701/32.7 |
| 12,263,783 B2* | 4/2025 | Kurokawa .............. | B60Q 1/34 |
| 2007/0047588 A1 | 3/2007 | Koga et al. | |
| 2018/0321729 A1 | 11/2018 | Kim et al. | |
| 2020/0344090 A1* | 10/2020 | Park ................... | H04L 12/4625 |
| 2022/0274521 A1* | 9/2022 | Kurokawa .............. | B60Q 1/34 |
| 2023/0089480 A1* | 3/2023 | Tani ..................... | B60R 16/023 701/36 |
| 2023/0318873 A1* | 10/2023 | Saitoh .............. | H04L 12/40006 710/110 |
| 2024/0127635 A1* | 4/2024 | Komiyama ............ | G06V 20/58 |
| 2024/0239404 A1* | 7/2024 | Kim .................... | B62D 5/0481 |

FOREIGN PATENT DOCUMENTS

| | | | |
|---|---|---|---|
| JP | 2016201740 A | * | 12/2016 |
| JP | 2021-132336 A | | 9/2021 |
| JP | 2022144788 A | * | 10/2022 |

OTHER PUBLICATIONS

Machine Translation of Chinese Patent Application CN 102571251 A, 2012. (Year: 2012).*
Machine Translation of Japanese Patent Applications JP 2021024315 A, 2021. (Year: 2021).*
Machine Translation of Japanese Patent Applications JP 2021024316 A, 2021. (Year: 2021).*
Machine Translation of Japanese Patent Application JP 2022144788 A, 2022. (Year: 2022).*
'Bosch Controller Area Network (CAN) Version 2.0' 1998. (Year: 1998).*
Japanese Office Action issued Jan. 16, 2024 in corresponding Japanese application No. 2022-061063; English translation included (8 pages).
Japanese Office Action dated Apr. 16, 2024 issued in corresponding Japanese application No. 2022-061063; English machine translation included (5 pages).

* cited by examiner

VEHICLE COMMUNICATION SYSTEM, VEHICLE COMMUNICATION METHOD, AND CONTROL DEVICE

INCORPORATION BY REFERENCE

The present application claims priority under 35 U.S.C. § 119 to Japanese Patent Application No. 2022-061063 filed on Mar. 31, 2022. The content of the application is incorporated herein by reference in its entirety.

BACKGROUND OF THE INVENTION

Field of the Invention

The present invention relates to a vehicle communication system, a vehicle communication method, and a control device.

Description of the Related Art

A communication system including at least one relay station interposed between a master station and a slave station connected by a bus network has been conventionally disclosed (Japanese Patent Laid-Open No. 2007-97157). In this communication system, the slave station controls reply timing of a response frame from the slave station to the master station on the basis of a repeater delay time, the repeater delay time being set on the basis of the number of relay stations interposed.

In the configuration in which the delay time is uniformly set in accordance with the number of interposed relay stations as in the conventional technique, a margin time (margin) included in the delay time increases as the number of relay stations increases, which may make it difficult to configure a communication system having high responsivity.

It is an object of the present invention to shorten a communication delay time between control devices that transfer signals via a device that relays communication, thereby achieving a communication system having high responsivity.

The present application solves the above problem, and, for example, improves the operability of a vehicle and further improves traffic safety, thereby contributing to the development of sustainable transportation systems.

SUMMARY OF THE INVENTION

One aspect of the present invention is a vehicle communication system mounted on a vehicle, the vehicle communication system including: a communication network including a plurality of communication transmission lines; and a plurality of ECUs connected by the communication network, each of the ECUs including an identification unit that identifies a target ECU, and a relay transmission line and a relay ECU based on an input signal or input information, the target ECU being another one of the ECUs to be a communication partner, the relay transmission line and the relay ECU being the communication transmission line and still another one of the ECUs through which communication with the target ECU is routed, a standby time determination unit that determines a transmission standby time, the transmission standby time being a time from transmission of an activation instruction to another one of the ECUs closest to the ECU along the relay transmission line to transmission of a control signal toward the target ECU, and a communication unit that transmits the control signal after an elapse of the transmission standby time after transmitting the activation instruction to the relay transmission line closest to the ECU.

According to another aspect of the present invention, the communication transmission lines include a synchronous communication bus that allows communication to start synchronously between all the ECUs connected to the synchronous communication bus, and an asynchronous communication bus that allows communication to start asynchronously between the ECUs connected to the asynchronous communication bus.

According to another aspect of the present invention, when the closest relay transmission line is the asynchronous communication bus, the communication unit repeatedly sends out, to the asynchronous communication bus, the activation instruction to the closest other ECU at predetermined time intervals.

According to another aspect of the present invention, when the communication unit receives an activation instruction transmitted by another one of the ECUs as an input signal or input information and repeatedly transmits an activation instruction to the asynchronous communication bus based on the input signal or input information, the communication unit causes the ECU as a transmission source of the received activation instruction to wait to transmit the control signal until the transmission standby time elapses after the activation instruction is transmitted to the asynchronous communication bus.

According to another aspect of the present invention, the standby time determination unit determines the transmission standby time based on an activation time of the closest other ECU along the relay transmission line.

Another aspect of the present invention is a vehicle communication method executed by a computer of a control device mounted on a vehicle, a plurality of the control devices being connected to each other by a communication network including a plurality of communication transmission lines to constitute a vehicle communication system, the method including the steps of: identifying a target ECU, and a relay transmission line and a relay ECU based on an input signal or input information, the target ECU being another one of the control devices to be a communication partner, the relay transmission line and the relay ECU being the communication transmission line and still another one of the control devices through which communication with the target ECU is routed; determining a transmission standby time, the transmission standby time being a time from transmission of an activation instruction to another one of the control devices closest to the control device along the relay transmission line to transmission of a control signal toward the target ECU; and transmitting the control signal after an elapse of the transmission standby time after transmitting the activation instruction to the relay transmission line closest to the control device.

Still another aspect of the present invention is a control device mounted on a vehicle, a plurality of the control devices being connected to each other by a communication network including a plurality of communication transmission lines to constitute a vehicle communication system, each of the control devices including: an identification unit that identifies a target ECU, and a relay transmission line and a relay ECU based on an input signal or input information, the target ECU being another one of the control devices to be a communication partner, the relay transmission line and the relay ECU being the communication transmission line and still another one of the control devices through which communication with the target ECU is routed; a standby time determination unit that determines a transmission standby time, the transmission standby time being a time from transmission of an activation instruction to another one of the control devices closest to the control device along the relay transmission line to transmission of a control signal toward the target ECU; and a communication unit that transmits the control signal after an elapse of the transmission standby time after transmitting the activation instruction to the relay transmission line closest to the control device.

According to an aspect of the present invention, it is possible to reduce a communication delay time between control devices that transfer signals via a device that relays communication, thereby achieving a communication system having high responsivity.

DETAILED DESCRIPTION OF THE PREFERRED EMBODIMENTS

Hereinbelow, a vehicle communication system 1 according to an embodiment will be described.

Figure 1:
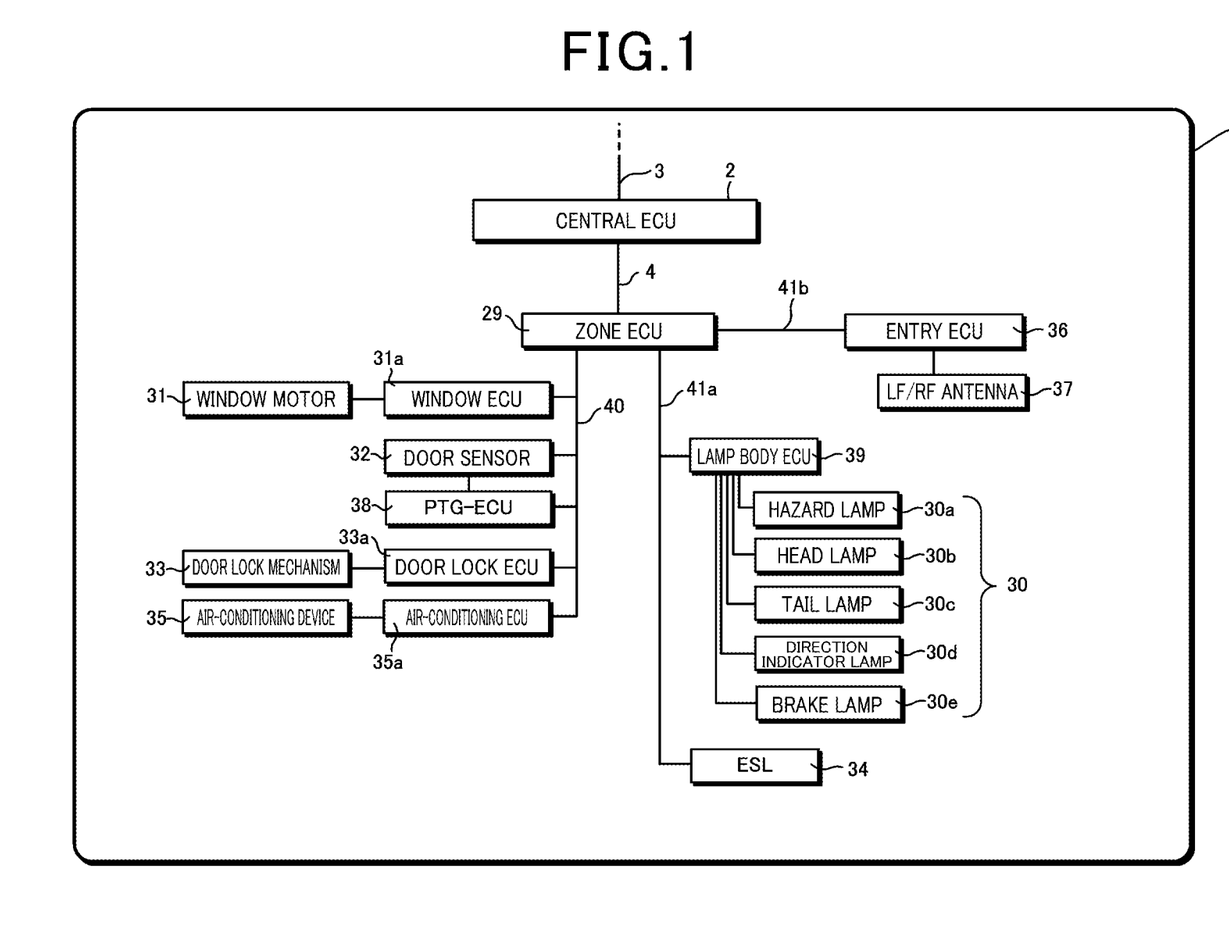
FIG. 1 is a diagram showing the configuration of a vehicle communication system according to an embodiment of the present invention.

FIG. 1 is a diagram showing the configuration of the vehicle communication system 1.

The vehicle communication system 1 includes a communication network including a plurality of communication transmission lines, and a plurality of electronic control units (ECUs), which are control devices each having a processor and connected by the communication network. The communication network may include a plurality of communication transmission lines with different communication protocols.

In the present embodiment, the vehicle communication system 1 includes a central ECU 2 that performs general control and information processing on a vehicle. The central ECU 2 is connected to a communication line including a first communication line 3 and a second communication line 4. The central ECU 2 functions as a gateway that manages the transfer of communication data between these communication lines.

Each of the first communication line 3 and the second communication line 4 includes a bus that performs communication compliant with the CAN, Ethernet (registered trademark), or another standard or a communication line that performs Peer to Peer (P2P) communication. Note that the first communication line 3 may include a plurality of communication lines that perform communication compliant with the same standard or may include a plurality of communication lines that perform communication compliant with different standards. The same applies to the second communication line 4.

For example, one or more other ECUs, such as a telematics control unit having a transmitter and a receiver(TCU, not shown), are connected to the first communication line 3.

A zone ECU 29 is connected to the second communication line 4. An electronic steering lock (ESL) 34 and a lamp body ECU 39 that controls lighting of a lamp body 30 are connected to the zone ECU 29 via a communication line 41a. In the present embodiment, the lamp body 30 specifically includes a hazard lamp 30a, a head lamp 30b, a tail lamp 30c, a direction indicator lamp 30d, and a brake lamp 30e.

Also, an entry ECU 36 is connected to the zone ECU 29 via a communication line 41b. An LF/RF antenna 37 that performs wireless communication with an electronic key of a subject vehicle is connected to the entry ECU 36. The electronic key is an electronic device having a wireless communication function and called a smart key or a FOB key. The entry ECU 36 processes user access from outside of the vehicle and enables a smart entry operation in cooperation with other on-board ECUs.

Also, a window ECU 31a, a door sensor 32, a PTG-ECU 38, a door lock ECU 33a, and an air-conditioning ECU 35a are connected to the zone ECU 29 via a communication line 40. The door sensor 32 detects an operation on a vehicle door. The window ECU 31a, the door lock ECU 33a, and the air-conditioning ECU 35a control the operation of a window motor 31 that opens and closes a vehicle window, the operation of a door lock mechanism 33 that locks and unlocks the vehicle door, and the operation of an air-conditioning device 35, respectively. The PTG-ECU 38 controls the operation of a power tail gate (electric rear gate, not shown).

Hereinbelow, a vehicle equipped with the vehicle communication system 1 is referred to as the subject vehicle, and a user who uses the subject vehicle is referred to as a vehicle user.

The central ECU 2, the zone ECU 29, the entry ECU 36, the lamp body ECU 39, the window ECU 31a, the PTG-ECU 38, the door lock ECU 33a, and the air-conditioning ECU 35a correspond to the ECU or the control device in the present disclosure.

The first communication line 3 and the second communication line 4, and the communication lines 40, 41a, and 41b correspond to the plurality of communication transmission lines that constitute the communication network in the present disclosure.

These communication transmission lines may include communication transmission lines with different communication protocols. In the present embodiment, for example, the first communication line 3 includes a plurality of communication transmission lines including an Ethernet (registered trademark) communication bus, and the second communication line 4 includes an Ethernet communication bus. The communication lines 41a and 41b are, for example, CAN-FD communication buses that perform communication compliant with the CAN-FD communication standard. The communication line 40, for example, is a CAN communication bus that performs communication compliant with the CAN-B or CAN-C communication standard.

The present embodiment is premised on the CAN-FD communication bus designed to perform asynchronous communication and the CAN communication bus designed to perform synchronous communication. That is, the communication lines 41a and 41b, which are the CAN-FD communication buses, correspond to the asynchronous communication bus that allows communication to start asynchronously between the ECUs connected to the asynchronous communication bus in the present disclosure. The communication line 40, which is the CAN communication bus, corresponds to the synchronous communication bus that allows communication to start synchronously between all the ECUs connected to the synchronous communication bus. That is, the communication transmission lines included in the vehicle communication system 1 include the synchronous communication bus and the asynchronous communication bus.

In the vehicle communication system 1 according to the present embodiment, each of the ECUs connected to the communication network identifies a target ECU, and a relay transmission line and a relay ECU on the basis of an input signal or input information, the target ECU being another ECU to be a communication partner, the relay transmission line and the relay ECU being the communication transmission line and another ECU through which communication with the target ECU is routed. The ECU determines a transmission standby time on the basis of information on the identified relay ECU and relay transmission line, the transmission standby time being the time from transmission of an activation instruction to another ECU closest thereto (that is, the closest relay ECU or the target ECU if no closest relay ECU is present) along the relay transmission line to transmission of a control signal toward the target ECU. Then, the ECU transmits the control signal after an elapse of the determined transmission standby time after transmitting the activation instruction to the closest relay transmission line.

Hereinbelow, two examples of the communication operation in the vehicle communication system 1 according to the present embodiment will be described.

Figure 2:
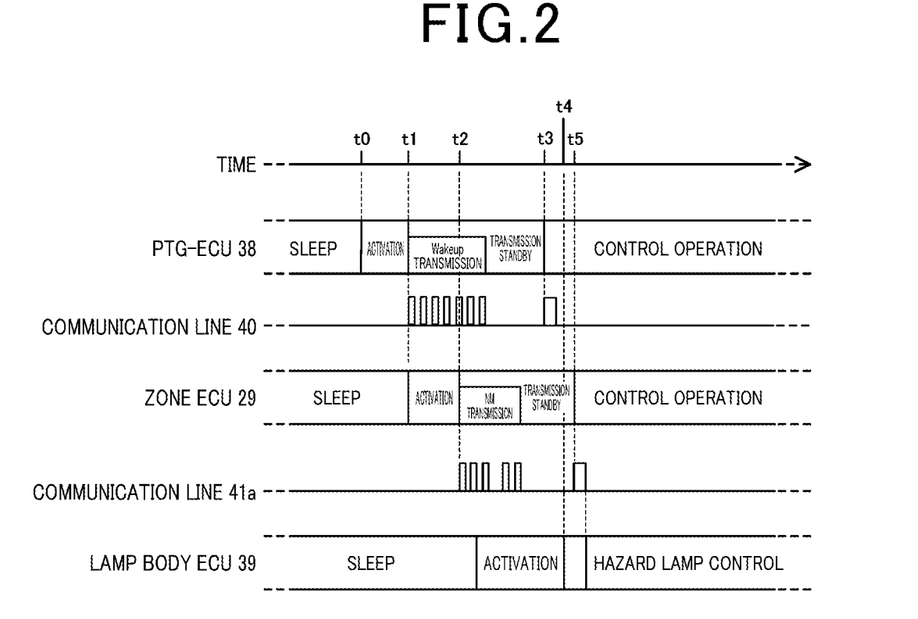
FIG. 2 is a diagram for explaining a first example of a communication operation in the vehicle communication system.

A first example of the communication operation is communication from the PTG-ECU 38 to the lamp body ECU 39.

The communication from the PTG-ECU 38 to the lamp body ECU 39 is performed, for example, in a hazard answer back operation to cause the hazard lamp 30a to blink when a lock button of a tail gate door (both not shown) of the subject vehicle is pressed.

FIG. 2 is a diagram for explaining the communication operation in the first example.

In FIG. 2, a horizontal axis in the first row from the top of the drawing (highest row) shows time, and the second row shows the state of the PTG-ECU 38. The third row shows a frame or a message transmitted through the communication line 40, and the fourth row shows the state of the zone ECU 29. The fifth row shows a frame or a message transmitted through the communication line 41a, and the sixth row shows the state of the lamp body ECU 39. In FIG. 2, time flows from left to right. In FIG. 2, all of the PTG-ECU 38, the zone ECU 29, and the lamp body ECU 39 are initially in a sleep state.

First, at time t0, the PTG-ECU 38 receives, from the lock button of the tail gate, a detection signal indicating that the lock button has been pressed and starts activation accordingly. The detection signal corresponds to the input signal or input information in the present disclosure.

Upon completion of the activation at time t1, the PTG-ECU 38 sets the lamp body ECU 39 as the target ECU to execute the hazard answer back previously set as a response to the pressing of the lock button. The PTG-ECU 38 identifies the communication line 40 and the communication line 41a as the relay transmission lines relating to communication to the lamp body ECU 39 and identifies the zone ECU 29 as the relay ECU. The identification of the relay transmission lines and the relay ECU can be performed, for example, on the basis of communication network information stored in a memory of the PTG-ECU 38. In the identification of the relay transmission line, the PTG-ECU 38 also identifies whether the relay transmission line is the synchronous communication bus or the asynchronous communication bus (more specifically, the CAN communication bus or the CAN-FD communication bus). As described above, in the present embodiment, the communication line 40 is the CAN communication bus, which is the synchronous communication bus, and the communication line 41a is the CAN-FD communication bus, which is the asynchronous communication bus.

Also, on the basis of an activation time of the zone ECU 29 serving as the closest relay ECU along the communication lines 40 and 41a serving as the relay transmission lines, the PTG-ECU 38 determines a transmission standby time, the transmission standby time being the time from transmission of an activation instruction to the zone ECU 29 to transmission of a control signal. The activation time of the zone ECU 29 may be previously stored in the PTG-ECU 38.

Then, after completion of the activation at time t1, the PTG-ECU 38 starts transmission of a wake-up frame to the communication line 40 serving as the closest relay transmission line, the wake-up frame being an activation instruction compliant with the CAN communication protocol. The wave-up frame transmitted by the PTG-ECU 38 includes information indicating that the lamp body ECU 39 is a communication partner (that is, the target ECU) of the PTG-ECU 38.

The zone ECU 29 connected to the communication line 40, which is the synchronous bus, normally starts activation in response to receiving the first wake-up frame and completes the activation at time t2.

Then, at time t3 when the determined transmission standby time elapses, the PTG-ECU 38 transmits a control signal for providing an instruction to cause the hazard lamp 30a to blink to the lamp body ECU 39.

Immediately after the completion of the activation at time t2, the zone ECU 29 identifies the communication line 41a as the relay transmission line relating to communication to the lamp body ECU 39 serving as the target ECU. Also, on the basis of an activation time of the lamp body ECU 39 serving as the closest target ECU along the communication line 41a serving as the relay transmission line, the zone ECU 29 determines a transmission standby time, the transmission standby time being the time from transmission of an activation instruction to the lamp body ECU 39 to transmission of the control signal.

Then, after the completion of the activation at time t2, the zone ECU 29 transmits, toward the lamp body ECU 39 serving as the target ECU, an activation instruction compliant with the CAN-FD communication protocol to the communication line 41a serving as the closest relay transmission line. The activation instruction is transmitted as a network management (NM) message frame (hereinbelow, referred to as the NM message) compliant with the CAN-FD communication protocol. In the present embodiment, in particular, since the communication line 41a is the asynchronous communication bus, the zone ECU 29 repeatedly transmits the NM message as the activation instruction (hereinbelow, referred to as the activation NM message) at predetermined time intervals. Note that the time interval may be determined on the basis of a time required to activate the lamp body ECU 39. Alternatively, the time interval may be previously determined.

The zone ECU 29 that has completed its activation can normally receive the control signal transmitted by the PTG-ECU 38 at time t3 thereafter.

The lamp body ECU 39 connected to the communication line 41a, which is the asynchronous communication bus, does not always receive the first NM message due to asynchronous communication. In the present embodiment, since the zone ECU 29 repeatedly transmits the activation NM message multiple times at the predetermined time intervals, the lamp body ECU 39 serving as the target ECU can reliably receive the activation NM message.

In the example of FIG. 2, the lamp body ECU 39 receives the second activation NM message and starts activation, and completes the activation at time t4. Then, the zone ECU 29 transmits the control signal received at time t3 from the PTG-ECU 38 to the lamp body ECU 39 at time t5 when the transmission standby time determined by itself elapses. The lamp body ECU 39 that has completed its activation normally receives the control signal and starts controlling the hazard lamp.

As described in the first example, in the present embodiment, the zone ECU 29 whose closest relay transmission line is the communication line 41a repeatedly transmits the activation NM message to the communication line 41a, which is the asynchronous transmission bus. Thus, in the present embodiment, the lamp body ECU 39 serving as the target ECU connected to the communication line 41a, which is the asynchronous communication bus, can reliably receive the activation NM message and start activation without causing any reception error. The PTG-ECU 38 transmits the control signal after an elapse of the transmission standby time determined on the basis of the activation time of the zone ECU 29 serving as the closest communication partner. The zone ECU 29 transmits the control signal after an elapse of the transmission standby time determined on the basis of the activation time of the lamp body ECU 39 serving as the closest communication partner. Thus, in the present embodiment, as compared to the conventional communication system that performs communication using the repeater delay time uniformly set on the basis of the number of relay stations (or relay devices), it is possible to shorten the time to when the target ECU (the lamp body ECU 39 in the first example) receives the control signal transmitted by the ECU that is the first one to start activation (the PTG-ECU 38 in the first example), thereby achieving the communication system having high responsivity.

Figure 3:
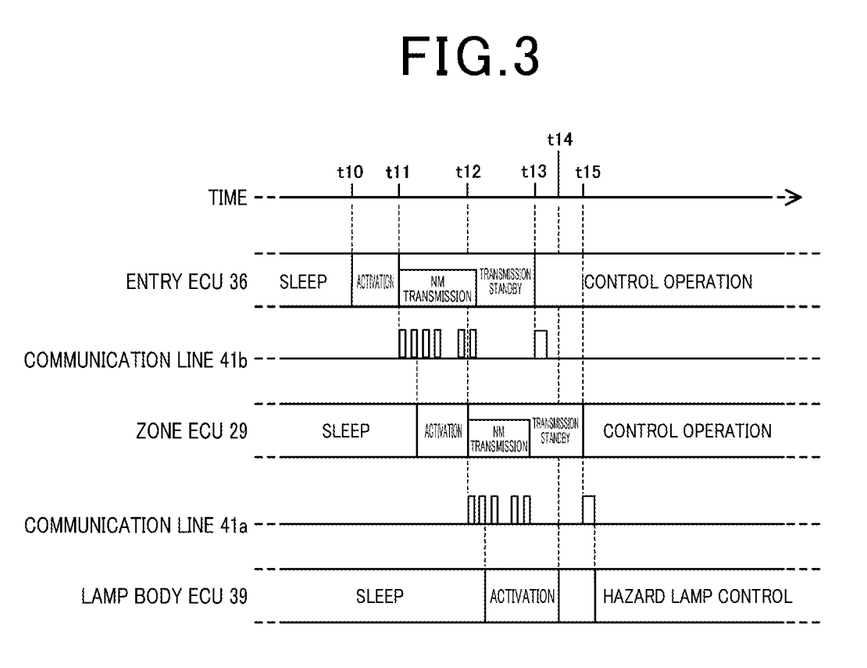
FIG. 3 is a diagram for explaining a second example of the communication operation in the vehicle communication system.

The second example of the communication operation is communication from the entry ECU 36 to the lamp body ECU 39.

The communication from the entry ECU 36 to the lamp body ECU 39 is performed, for example, in a hazard answer back operation to cause the hazard lamp 30a to blink when the vehicle user locks or unlocks the vehicle door using the electronic key (not shown).

FIG. 3 is a diagram for explaining the communication operation in the second example.

In FIG. 3, a horizontal axis in the first row from the top of the drawing (highest row) shows time, and the second row shows the state of the entry ECU 36. The third row shows a frame or a message transmitted through the communication line 41b, and the fourth row shows the state of the zone ECU 29. The fifth row shows a frame or a message transmitted through the communication line 41a, and the sixth row shows the state of the lamp body ECU 39. In FIG. 3, time flows from left to right. In FIG. 3, all of the entry ECU 36, the zone ECU 29, and the lamp body ECU 39 are initially in a sleep state.

First, at time t10, the entry ECU 36 receives a locking command or an unlocking command (hereinbelow, referred to as the locking or unlocking command) for locking or unlocking the vehicle door from the electronic key and starts activation accordingly. The locking or unlocking command corresponds to the input signal or input information in the present disclosure.

Upon completion of the activation at time t11, the entry ECU 36 sets the lamp body ECU 39 as the target ECU to execute the hazard answer back previously set as a response to the locking or unlocking command. The entry ECU 36 identifies the communication lines 41b and 41a as the relay transmission lines relating to the communication to the lamp body ECU 39 and identifies the zone ECU 29 as the relay ECU. As with the first example, the identification of the relay transmission lines and the relay ECU may be performed, for example, on the basis of communication network information stored in a memory of the entry ECU 36. In the identification of the relay transmission line, the entry ECU 36 also identifies whether the relay transmission line is the synchronous communication bus or the asynchronous communication bus.

Also, on the basis of an activation time of the zone ECU 29 serving as the closest ECU along the communication lines 41b and 41a serving as the relay transmission lines, the entry ECU 36 determines a transmission standby time, the transmission standby time being the time from transmission of an activation instruction to the zone ECU 29 to transmission of a control signal. The activation time of the zone ECU 29 may be previously stored in the entry ECU 36.

Then, after completion of the activation at time t11, the entry ECU 36 starts transmission of an activation NM message to the communication line 41b serving as the closest relay transmission line, the activation NM message being an activation instruction compliant with the CAN-FD communication protocol. As with the first example described above, in the present embodiment, in particular, since the communication line 41b is the asynchronous communication bus, the entry ECU 36 repeatedly transmits the activation NM message at predetermined time intervals. The activation NM message includes information indicating that the lamp body ECU 39 is a communication partner (that is, the target ECU) of the entry ECU 36.

As described above relating to the communication line 41a, the zone ECU 29 connected to the communication line 41b, which is the asynchronous communication bus, does not always receive the first NM message due to asynchronous communication. In the present embodiment, since the entry ECU 36 repeatedly transmits the activation NM message, the zone ECU 29 can reliably receive the activation NM message.

In the example of FIG. 3, the zone ECU 29 receives the second activation NM message and starts activation, and completes the activation at time t12. Then, at time t13 when the transmission standby time determined by itself elapses, the entry ECU 36 transmits a control signal for providing an instruction to cause the hazard lamp 30a to blink to the lamp body ECU 39.

Immediately after the completion of the activation at time t12, the zone ECU 29 identifies the communication line 41a as the relay transmission line relating to communication to the lamp body ECU 39 serving as the target ECU. Also, on the basis of an activation time of the lamp body ECU 39 serving as the closest target ECU along the communication line 41a serving as the relay transmission line, the zone ECU 29 determines a transmission standby time, the transmission standby time being the time from transmission of an activation instruction to the lamp body ECU 39 to transmission of the control signal.

Then, as with the first example, after the completion of the activation at time t12, the zone ECU 29 repeatedly transmits, toward the lamp body ECU 39 serving as the target ECU, the activation NM message to the communication line 41a serving as the closest relay transmission line at predetermined time intervals, the activation NM message being an activation instruction compliant with the CAN-FD communication protocol.

The zone ECU 29 that has completed its activation can normally receive the control signal transmitted by the entry ECU 36 at time t13 thereafter.

The lamp body ECU 39, for example, receives the second activation NM message and starts activation, and completes the activation at time t14. Then, the zone ECU 29 transmits the control signal received at time t13 from the entry ECU 36 to the lamp body ECU 39 at time t15 when the transmission standby time determined by itself elapses. The lamp body ECU 39 that has completed its activation normally receives the control signal and starts controlling the hazard lamp.

As with the first example described above, in the second example, the entry ECU 36 whose closest relay transmission line is the communication line 41b and the zone ECU 29 whose closest relay transmission line is the communication line 41a respectively repeatedly transmit the activation NM message to the communication line 41b and the communication line 41a, which are the asynchronous transmission buses. Thus, in the present embodiment, the zone ECU 29 connected to the communication line 41b and the lamp body ECU 39 connected to the communication line 41a can reliably receive the activation NM message and start activation without causing any reception error.

The entry ECU 36 transmits the control signal after an elapse of the transmission standby time determined on the basis of the activation time of the zone ECU 29 serving as the closest communication partner. The zone ECU 29 transmits the control signal after an elapse of the transmission standby time determined on the basis of the activation time of the lamp body ECU 39 serving as the closest communication partner. Thus, in the present embodiment, as compared to the conventional communication system that performs communication using the repeater delay time uniformly set, it is possible to shorten the time to when the target ECU (the lamp body ECU 39 in the second example) receives the control signal transmitted by the ECU that is the first one to start activation (the entry ECU 36 in the second example), thereby achieving the communication system having high responsivity.

Next, the configuration of the ECU will be described.

Figure 4:
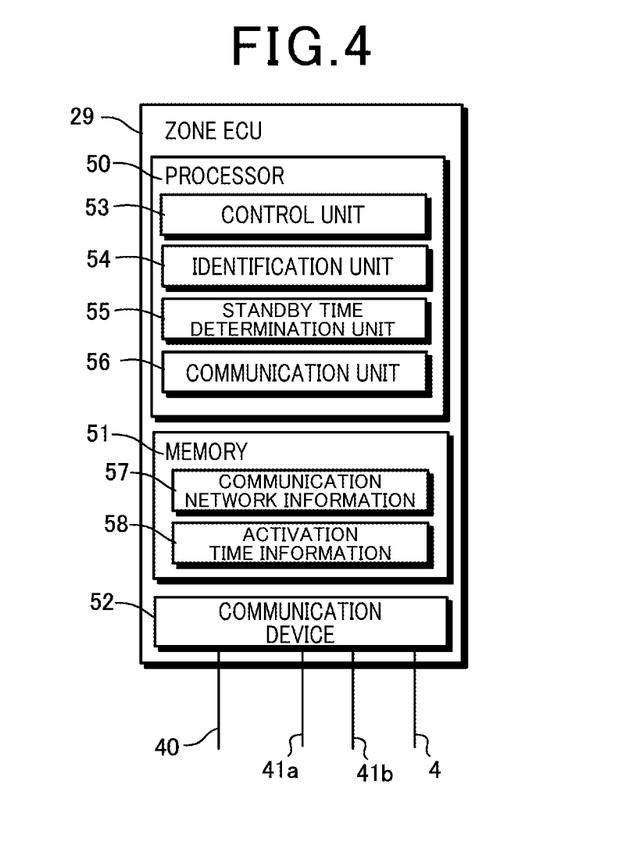
FIG. 4 is a diagram showing the configuration of a zone ECU as an example of an ECU included in the vehicle communication system.

FIG. 4 is a diagram showing the configuration of the zone ECU 29 as an example of the ECU.

The zone ECU 29 includes a processor 50, a memory 51, and a communication device 52. The memory 51 includes, for example, a volatile or nonvolatile semiconductor memory. Communication network information 57 is previously stored in the memory 51, the communication network information 57 being information on each on-board device such as the ECU included in the vehicle communication system 1 shown in FIG. 1 and communication transmission lines that connect the on-board devices. Also, activation time information 58 is previously stored in the memory 51, the activation time information 58 being information on the activation time of each on-board device such as the ECU included in the vehicle communication system 1.

The communication device 52 is a transceiver for communicating with another ECU via the communication network.

The communication device 52 includes, for example, a CAN transceiver that performs communication via the communication line 40 configured as the CAN communication bus, which is the synchronous communication bus, and a CAN-FD transceiver that performs communication with the second communication line 4 and the communication lines 41a and 41b, the second communication line 4 and the communication lines 41a, 41b being configured as the CAN-FD communication buses, which are the asynchronous communication buses.

The processor 50 is, for example, a computer including a CPU. The processor 50 includes, as functional elements or functional units, a control unit 53, an identification unit 54, a standby time determination unit 55, and a communication unit 56. These functional elements may be implemented by the processor 50, which is the computer, executing a program. Note that the computer program can be stored in any computer-readable storage medium. Alternatively, all or some of the functional elements included in the processor 50 may each be configured as hardware including one or more electronic circuit components.

The control unit 53 performs a predetermined control operation previously determined to be executed by its ECU (the zone ECU 29 in this example). In the zone ECU 29, the control operation performed by the control unit 53 may include, for example, a communication relay operation that controls a communication flow between different communication lines connected to the communication device 52.

The identification unit 54 identifies the target ECU, the target ECU being another ECU to be a communication partner relating to the control operation, on the basis of an input signal or input information received via the communication device 52 or directly received from another sensor or device (not shown). Also, the identification unit 54 refers to the communication network information stored in the memory 51 and identifies the relay transmission line and the relay ECU, the realty transmission line and the relay ECU being the communication transmission line and another ECU through which communication with the identified target ECU is routed.

The standby time determination unit 55 determines a transmission standby time on the basis of information on the relay ECU and the relay transmission line identified by the identification unit 54, the transmission standby time being the time from transmission of an activation instruction to another ECU closest thereto (that is, the closest relay ECU or the target ECU if no closest relay ECU is present, the same applies to the following description) along the relay transmission line to transmission of a control signal toward the target ECU. The standby time determination unit 55, for example, refers to the activation time information stored in the memory 51 and determines the transmission standby time on the basis of the activation time of the closest other ECU along the relay transmission line. Also, a predetermined uniform transmission standby time may be used regardless of the relay transmission line and the target ECU.

The communication unit 56 transmits, to the closest relay transmission line, an activation instruction that instructs the closest other ECU to activate. Also, after starting the transmission of the activation instruction, the communication unit 56 transmits the control signal toward the target ECU after an elapse of the transmission standby time from the start of the transmission of the activation instruction. Accordingly, in the present embodiment, since the control signal is transmitted after completion of the activation of the closest other ECU, the closest other ECU can reliably receive the transmitted control signal. Also, since the transmission standby time is determined on the basis of the activation time of the closest other ECU, in the vehicle communication system 1 according to the present embodiment, the responsivity as a communication system, for examples, the responsivity in a cooperative operation between ECUs can be improved compared to the conventional communication system that uses the delay time uniformly determined in accordance with the number of relay devices.

When the closest relay transmission line is the asynchronous communication bus, the communication unit 56 repeatedly sends out, to the asynchronous communication bus serving as the relay transmission line, the activation instruction to the closest other ECU at predetermined time intervals after an input signal or input information is received. This enables the closest other ECU connected to the asynchronous communication bus serving as the relay transmission line to reliably receive the activation instruction.

When the communication unit 56 receives an activation instruction transmitted by another ECU as an input signal or input information and sends out the activation instruction to the asynchronous communication bus on the basis of the input signal or input information, the communication unit 56 may instruct the ECU that is a transmission source of the received activation instruction to wait to transmit the control signal until the transmission standby time elapses after the activation instruction is transmitted to the asynchronous communication bus. This instruction may be transmitted, for example, by the communication unit 56 to the other ECU that has transmitted the activation instruction as an input signal or input information via a communication transmission line between the ECU and the other ECU. Alternatively, when the communication transmission line between the ECU and the other ECU that has transmitted the activation instruction as an input signal or input information can be set to a busy state, the communication unit 56 may set the communication transmission line to a busy state to perform this instruction.

Note that, as described above, the zone ECU 29 shown in FIG. 4 is an example of the ECU, and the other ECUs may have the same function as the zone ECU 29 shown in FIG. 4. In this case, the control unit 53 is configured to perform a control operation corresponding to a control function given to each of the ECUs. The identification unit 54 may identify the target ECU to be a communication partner relating to the control operation on the basis of an input signal or input information determined in accordance with the control function.

Figure 5:
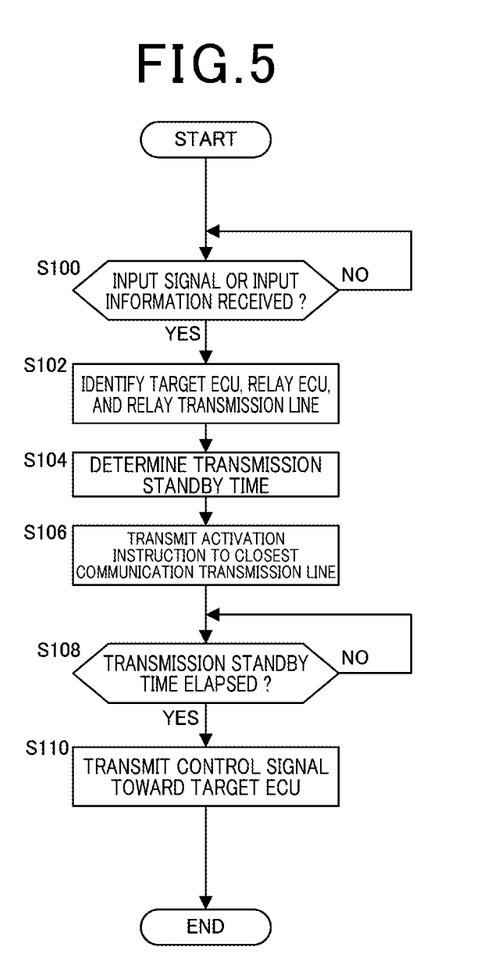
FIG. 5 is a flowchart showing a procedure of a communication operation at the start of communication in the ECU included in the vehicle communication system.

Next, a procedure of a communication operation executed by the on-board ECU (control device) included in the vehicle communication system 1 according to the present invention at the start of communication with another ECU will be described. FIG. 5 is a flowchart showing the procedure of the communication operation. The communication operation is executed, for example, by the zone ECU 29, which is an example of the ECU. In the communication operation in FIG. 5, the ECUs relating to the communication operation including the zone ECU 29 are in a sleep state in which a control operation is stopped.

When a process is started, the identification unit 54 determines whether an input signal or input information has been received in a sleep state (S100). The input signal or input information can be received from another ECU and/or from an on-board device such as a sensor. When no input signal or input information has been received (S100: NO), the identification unit 54 returns to step S100 and repeats the process, and waits until the input signal or input information is received.

On the other hand, when the input signal or input information has been received (S100: YES), the identification unit 54 identifies the target ECU, and the relay transmission line and the relay ECU through which communication with the target ECU should be routed on the basis of the received input signal or input information (S102). As described above, the target ECU refers to another ECU to be a communication partner of the communication unit 56. The relay transmission line refers to the communication transmission line through which the communication with the target ECU is routed, and the relay ECU refers to another ECU through which the communication with the target ECU is routed.

Then, the standby time determination unit 55 determines a transmission standby time on the basis of information on the identified relay ECU and relay transmission line (S104). As described above, the transmission standby time refers to the standby time from transmission of an activation instruction to the closest other ECU along the relay transmission line to transmission of a control signal toward the target ECU. In the present embodiment, specifically, the transmission standby time refers to the standby time from the start of the transmission of the activation instruction to the transmission of the control signal.

Next, after the communication unit 56 transmits the activation instruction to the closest commutation transmission line along the relay transmission line (S106), the communication unit 56 determines whether the determined transmission standby time has elapsed from the start of the transmission of the activation instruction (S108). Then, when the transmission standby time has not elapsed (S108: NO), the communication unit 56 returns to step S108 and repeats the process, and waits until the transmission standby time elapses.

On the other hand, when the transmission standby time has elapsed (S108: YES), the communication unit 56 transmits, toward the target ECU, a control signal relating to the control operation of the target ECU (S110) and finishes the process.

Another Embodiment

While, in the present embodiment described above, the transmission standby time determined by the standby time determination unit 55 is the standby time from the start of the transmission of the activation instruction to the transmission of the control signal, this is not a limitation. For example, when the activation signal is repeatedly transmitted, the transmission standby time may be a standby time after transmission of the last activation signal is finished.

Note that the present invention is not limited to the configurations of the above embodiments and can be performed in various modes without departing from the gist of the invention.

For example, while the CAN bus and the CAN-FD bus are described as examples of the synchronous communication bus and the asynchronous communication bus in the above embodiment, the synchronous communication bus and the asynchronous communication bus are not limited to these buses.

Configurations Supported by the Above Embodiments

The embodiments described above support the following configurations.

(Configuration 1) A vehicle communication system mounted on a vehicle, the vehicle communication system including: a communication network including a plurality of communication transmission lines; and a plurality of ECUs connected by the communication network, each of the ECUs including an identification unit that identifies a target ECU, and a relay transmission line and a relay ECU based on an input signal or input information, the target ECU being another one of the ECUs to be a communication partner, the relay transmission line and the relay ECU being the communication transmission line and still another one of the ECUs through which communication with the target ECU is routed, a standby time determination unit that determines a transmission standby time, the transmission standby time being a time from transmission of an activation instruction to another one of the ECUs closest to the ECU along the relay transmission line to transmission of a control signal toward the target ECU, and a communication unit that transmits the control signal after an elapse of the transmission standby time after transmitting the activation instruction to the relay transmission line closest to the ECU.

According to the vehicle communication system of configuration 1, even when communication is performed through a plurality of ECUs, each of the ECUs determines the transmission standby time using information on another ECU closest thereto along the relay transmission line. Thus, it is possible to shorten the communication delay time from the ECU that starts communication to the target ECU, thereby achieving the vehicle communication system having high responsivity.

(Configuration 2) The vehicle communication system according to configuration 1, in which the communication transmission lines include a synchronous communication bus that allows communication to start synchronously between all the ECUs connected to the synchronous communication bus, and an asynchronous communication bus that allows communication to start asynchronously between the ECUs connected to the asynchronous communication bus.

According to the vehicle communication system of configuration 2, even when a plurality of communication transmission lines with different communication protocols are included, the vehicle communication system having high responsivity can be achieved.

(Configuration 3) The vehicle communication system according to configuration 2, in which when the closest relay transmission line is the asynchronous communication bus, the communication unit repeatedly sends out, to the asynchronous communication bus, the activation instruction to the closest other ECU at predetermined time intervals.

According to the vehicle communication system of configuration 3, the ECU connected by the asynchronous communication bus can reliably receive the activation instruction.

(Configuration 4) The vehicle communication system according to configuration 3, in which when the communication unit receives an activation instruction transmitted by another one of the ECUs as an input signal or input information and repeatedly transmits an activation instruction to the asynchronous communication bus based on the input signal or input information, the communication unit causes the ECU as a transmission source of the received activation instruction to wait to transmit the control signal until the transmission standby time elapses after the activation instruction is transmitted to the asynchronous communication bus.

According to the vehicle communication system of configuration 4, since the ECU that has started communication can transmit the control signal in accordance with the timing when the target ECU completes its activation, a cooperative operation between the ECUs can be easily executed.

(Configuration 5) The vehicle communication system according to any one of configurations 1 to 4, in which the standby time determination unit determines the transmission standby time based on an activation time of the closest other ECU along the relay transmission line.

According to the vehicle communication system of configuration 5, since the transmission standby time is determined in accordance with the activation time of the closest other ECU along the relay transmission line, even when communication is performed through a plurality of ECUs, it is possible to easily shorten the communication delay time from the ECU that starts communication to the target ECU, thereby achieving the vehicle communication system having higher responsivity.

(Configuration 6) A vehicle communication method executed by a computer of a control device mounted on a vehicle, a plurality of the control devices being connected to each other by a communication network including a plurality of communication transmission lines to constitute a vehicle communication system, the method including the steps of: identifying a target ECU, and a relay transmission line and a relay ECU based on an input signal or input information, the target ECU being another one of the control devices to be a communication partner, the relay transmission line and the relay ECU being the communication transmission line and still another one of the control devices through which communication with the target ECU is routed; determining a transmission standby time, the transmission standby time being a time from transmission of an activation instruction to another one of the control devices closest to the control device along the relay transmission line to transmission of a control signal toward the target ECU; and transmitting the control signal after an elapse of the transmission standby time after transmitting the activation instruction to the relay transmission line closest to the control device.

According to the vehicle communication method of configuration 6, even when communication is performed through a plurality of ECUs, each of the ECUs determines the transmission standby time using information on another ECU closest thereto along the relay transmission line. Thus, it is possible to shorten the communication delay time from the ECU that starts communication to the target ECU, thereby achieving the vehicle communication system having high responsivity.

(Configuration 7) A control device mounted on a vehicle, a plurality of the control devices being connected to each other by a communication network including a plurality of communication transmission lines to constitute a vehicle communication system, each of the control devices including: an identification unit that identifies a target ECU, and a relay transmission line and a relay ECU based on an input signal or input information, the target ECU being another one of the control devices to be a communication partner, the relay transmission line and the relay ECU being the communication transmission line and still another one of the control devices through which communication with the target ECU is routed; a standby time determination unit that determines a transmission standby time, the transmission standby time being a time from transmission of an activation instruction to another one of the control devices closest to the control device along the relay transmission line to transmission of a control signal toward the target ECU; and a communication unit that transmits the control signal after an elapse of the transmission standby time after transmitting the activation instruction to the relay transmission line closest to the control device.

According to the control device of configuration 7, it is possible to configure the vehicle communication system having high responsivity.

REFERENCE SIGNS LIST 1 vehicle communication system
2 central ECU
3 first communication line
4 second communication line
29 zone ECU
30 lamp body
30a hazard lamp
30b head lamp
30c tail lamp
30d direction indicator lamp
30d brake lamp
31 window motor
31a window ECU
32 door sensor
33 door lock mechanism
33a door lock ECU
34 ESL
35 air-conditioning device
35a air-conditioning ECU
36 entry ECU
37 LF/RF antenna
38 PTG-ECU
39 lamp body ECU
40, 41a, 41b communication line
50 processor
51 memory
52 communication device
53 control unit
54 identification unit
55 standby time determination unit
56 communication unit
57 communication network information
58 activation time information

What is claimed is:

1. A vehicle communication system mounted on a vehicle, the vehicle communication system comprising:
a communication network including a plurality of communication transmission lines; and
a plurality of electronic control units (ECUs) connected by the communication network,
wherein each one of the ECUs includes:
an identification unit that identifies a single target ECU, and a relay transmission line and a relay ECU based on an input signal or input information, the target ECU being another one of the ECUs and being a target to which a control signal is to be transmitted, the relay transmission line and the relay ECU being a communication transmission line and still another one of the ECUs, respectively, through which the control signal toward the target ECU is routed,
a standby time determination unit that determines a transmission standby time, the transmission standby time being a time from transmission of an activation instruction for whichever is closest of the relay ECU or the target ECU along the relay transmission line to the transmission of the control signal, and
a communication unit that transmits the control signal after an elapse of the transmission standby time after transmitting the activation instruction to a relay transmission line after transmitting the activation instruction to a relay transmission line directly connected to the communication unit and without transmitting the activation instruction to a relay transmission line connected to the communication unit through another ECU,
wherein the communication transmission lines include:
a synchronous communication bus that allows communication to start synchronously between all ECUs connected to the synchronous communication bus, and
an asynchronous communication bus that allows communication to start asynchronously between ECUs connected to the asynchronous communication bus, and
wherein when the directly connected relay transmission line is the asynchronous communication bus, the communication unit repeatedly sends out, to the asynchronous communication bus, the activation instruction to which is closest of the relay ECU or the target ECU at predetermined time intervals.

2. The vehicle communication system according to claim 1, wherein when the communication unit receives an activation instruction transmitted by another one of the ECUs as an input signal or input information and repeatedly transmits an activation instruction to the asynchronous communication bus based on the input signal or input information, the communication unit causes an ECU as a transmission source of the received activation instruction to wait to transmit the control signal until the transmission standby time elapses after the activation instruction is transmitted to the asynchronous communication bus.

3. The vehicle communication system according to claim 1, wherein the standby time determination unit determines the transmission standby time based on an activation time of whichever is closest of the relay ECU or the target ECU along the relay transmission line.

4. A vehicle communication method executed by a computer of one control device mounted on a vehicle, a plurality of control devices being connected to each other by a communication network including a plurality of communication transmission lines to constitute a vehicle communication system, the method comprising the steps of:
identifying a single target electronic control unit (ECU), and a relay transmission line and a relay ECU based on an input signal or input information, the target ECU being another one of the control devices and being a target to which a control signal is to be transmitted, the relay transmission line and the relay ECU being the communication transmission line and still another one of the control devices, respectively, through which the control signal toward the target ECU is routed;
determining a transmission standby time, the transmission standby time being a time from transmission of an activation instruction for whichever is closest of the relay ECU or the target ECU along the relay transmission line to transmission of the control signal; and
transmitting the control signal after an elapse of the transmission standby time after transmitting the activation instruction to a relay transmission line directly connected to the one control device and without transmitting the activation instruction to a relay transmission line connected to the one control device through another ECU, wherein the communication transmission lines include a synchronous communication bus that allows communication to start synchronously between all the ECUs connected to the synchronous communication bus, and an asynchronous communication bus that allows communication to start asynchronously between the ECUs connected to the asynchronous communication bus, and the method further comprises the step of, when the directly connected relay transmission line is the asynchronous communication bus, repeatedly sending out, to the asynchronous communication bus, the activation instruction whichever is closest of the relay ECU or the target ECU at predetermined time intervals.

5. A control device mounted on a vehicle, the control device being one control device, a plurality of control devices being connected to each other by a communication network including a plurality of communication transmission lines to constitute a vehicle communication system, each of the control devices comprising:

an identification unit that identifies a single target electronic control unit (ECU), and a relay transmission line and a relay ECU based on an input signal or input information, the target ECU being another one of the control devices and being a target to which a control signal is to be a transmitted, the relay transmission line and the relay ECU being the communication transmission line and still another one of the control devices, respectively, through which the control signal toward the target ECU is routed;

a standby time determination unit that determines a transmission standby time, the transmission standby time being a time from transmission of an activation instruction for whichever is closest of the relay ECU or the target ECU along the relay transmission line to transmission of the control signal; and a communication unit that transmits the control signal after an elapse of the transmission standby time after transmitting the activation instruction to a relay transmission line directly connected to the one control device and without transmitting the activation instruction to a relay transmission line connected to the one control device through another ECU, wherein the communication transmission lines include;

a synchronous communication bus that allows communication to start synchronously between all the ECUs connected to the synchronous communication bus, and an asynchronous communication bus that allows communication to start asynchronously between the ECUs connected to the asynchronous communication bus, and wherein when the directly connected relay transmission line is the asynchronous communication bus, the communication unit repeatedly sends out, to the asynchronous communication bus, the activation instruction to whichever is closest of the relay ECU or the target ECU at predetermined time intervals.

\* \* \* \* \*